(12) United States Patent
Takahashi (10) Patent No.: US 8,322,386 B2
(45) Date of Patent: Dec. 4, 2012

(54) PNEUMATIC TIRE WITH TREAD HAVING RIB WITH CHAMFERED WING PORTIONS

(75) Inventor: Fumio Takahashi, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 998 days.

(21) Appl. No.: 12/064,435

(22) PCT Filed: Aug. 21, 2006

(86) PCT No.: PCT/JP2006/316304
§ 371 (c)(1),
(2), (4) Date: Feb. 21, 2008

(87) PCT Pub. No.: WO2007/023759
PCT Pub. Date: Mar. 1, 2007

(65) Prior Publication Data
US 2009/0266458 A1 Oct. 29, 2009

(30) Foreign Application Priority Data
Aug. 23, 2005 (JP) .................................. 2005-240729

(51) Int. Cl.
*B60C 11/03* (2006.01)
*B60C 11/04* (2006.01)

(52) U.S. Cl. .......... 152/209.15; 152/209.18; 152/209.24

(58) Field of Classification Search ............. 152/209.15, 152/209.18, 209.21, 209.24
See application file for complete search history.

(56) References Cited

U.S. PATENT DOCUMENTS

| 5,188,684 | A | * | 2/1993 | Himuro | 152/209.15 |
| 7,114,540 | B2 | * | 10/2006 | Miyazaki | 152/209.21 |
| 2005/0072505 | A1 | * | 4/2005 | Takahashi | 152/209.15 |
| 2005/0167021 | A1 | * | 8/2005 | Takahashi | 152/209.15 |
| 2005/0241738 | A1 | | 11/2005 | Shida | |
| 2005/0257870 | A1 | * | 11/2005 | Ohsawa et al. | 152/209.9 |

(Continued)

FOREIGN PATENT DOCUMENTS

EP 0 602 989 A1 6/1994
(Continued)

OTHER PUBLICATIONS

English machine translation of Matsumoto, Tadao (JP2003-146024, published May 2003).*

(Continued)

*Primary Examiner* — Justin Fischer
*Assistant Examiner* — Robert Dye
(74) *Attorney, Agent, or Firm* — Sughrue Mion, PLLC (57) ABSTRACT

On a pneumatic tire provided with a lug-grooved rib 14 having a circumferentially continuous rib portion 14a and wing portions 14b defined by lug grooves 15, chamfers 14c of depth D2 and width L2 are formed on the wing portions 14b on the side facing a circumferential groove 11d. At the same time, the depth D2 and the width L2 of the chamfers 14c are so set that the ratio of the chamfer depth D2 to the groove depth D1 of the circumferential groove 11d satisfies $0.015 \leq (D2/D1) \leq 0.200$ and the ratio of the chamfer width L2 to the axial length L1 of the lug grooves 15 satisfies $0.1 \leq (L2/L1) \leq 0.85$, so that the load to be borne by the wing portions 14b is effectively shifted to the rib portion 14a. In this manner, the pitch noise caused by the lug grooves can be reduced without changing the basic features of the tread pattern, and thus the quietness of vehicular operation is improved.

11 Claims, 7 Drawing Sheets

U.S. PATENT DOCUMENTS

2006/0011279 A1 * 1/2006 Miyasaka ................ 152/209.15

FOREIGN PATENT DOCUMENTS

| | | | |
|---|---|---|---|
| EP | 1 566 291 A1 | | 8/2005 |
| JP | 02-179508 A | | 7/1990 |
| JP | 2179508 A | | 7/1990 |
| JP | 4193606 A | | 7/1992 |
| JP | 6199109 A | | 7/1994 |
| JP | 07-047808 A | | 2/1995 |
| JP | 7047808 A | | 2/1995 |
| JP | 07-266806 A | | 10/1995 |
| JP | 7266806 A | | 10/1995 |
| JP | 07-329516 | * | 12/1995 |
| JP | 07-329516 A | | 12/1995 |
| JP | 7329516 A | | 12/1995 |
| JP | 2000-225811 | * | 2/1999 |
| JP | 2002-059711 | * | 2/2002 |
| JP | 2003-146024 A | | 5/2003 |
| JP | 2003146024 A | | 5/2003 |
| JP | 2004-231092 A | | 8/2004 |
| JP | 2004231092 A | | 8/2004 |
| JP | 2006-224926 A | | 8/2006 |
| JP | 2006224926 A | | 8/2006 |
| WO | 2004024473 A1 | | 3/2004 |
| WO | WO2004/024472 | * | 3/2004 |
| WO | 2004/041556 A1 | | 5/2004 |

OTHER PUBLICATIONS

Supplementary European Search Report dated May 12, 2009 (6 pages).

Japanese Office Action issued in Japanese Application No. 2007-532094 dated May 18, 2011.

* cited by examiner

| | D1 DIMENTION (MM) | D2 DIMENTION (MM) | D2/D1 | RESULTANT INDEX |
|---|---|---|---|---|
| CONVENTIONAL EXAMPLE | — | — | — | 100 |
| COMPARATIVE EXAMPLE 1 | 7.5 | 0.08 | 0.010 | 97 |
| EXAMPLE 2 | 7.5 | 0.11 | 0.015 | 85 |
| EXAMPLE 1 | 7.5 | 0.40 | 0.053 | 80 |
| EXAMPLE 3 | 7.5 | 0.49 | 0.065 | 77 |
| EXAMPLE 4 | 7.5 | 0.75 | 0.100 | 80 |
| EXAMPLE 5 | 7.5 | 1.20 | 0.160 | 85 |
| EXAMPLE 6 | 7.5 | 1.50 | 0.200 | 89 |
| COMPARATIVE EXAMPLE 2 | 7.5 | 1.65 | 0.220 | 110 |

FOR ALL EXAMPLES: L1=15MM, L2=5MM, L3=20MM

| | L1 DIMENTION (MM) | L2 DIMENTION (MM) | L2/L1 | RESULTANT INDEX |
|---|---|---|---|---|
| CONVENTIONAL EXAMPLE | — | — | — | 100 |
| COMPARATIVE EXAMPLE 3 | 15 | 0.75 | 0.050 | 98 |
| EXAMPLE 7 | 15 | 1.50 | 0.100 | 86 |
| EXAMPLE 1 | 15 | 5.00 | 0.333 | 80 |
| EXAMPLE 8 | 15 | 6.00 | 0.400 | 78 |
| EXAMPLE 9 | 15 | 9.00 | 0.600 | 75 |
| EXAMPLE 10 | 15 | 10.50 | 0.700 | 73 |
| EXAMPLE 11 | 15 | 12.00 | 0.800 | 85 |
| EXAMPLE 12 | 15 | 12.75 | 0.850 | 90 |
| COMPARATIVE EXAMPLE 4 | 15 | 13.50 | 0.900 | 102 |

FOR ALL EXAMPLES: D1=7.5MM, LD=0.4MM, L3=20MM

| | L3 DIMENTION (MM) | L4 DIMENTION (MM) | L4/L3 | RESULTANT INDEX | L1 (MM) | L2 (MM) | L2/L1 |
|---|---|---|---|---|---|---|---|
| CONVENTIONAL EXAMPLE | — | — | — | 100 | — | — | — |
| COMPARATIVE EXAMPLE 5 | 25 | 7.5 | 0.30 | 97 | 20 | 17.5 | 0.88 |
| EXAMPLE 13 | 25 | 8.5 | 0.34 | 89 | 20 | 16.5 | 0.83 |
| EXAMPLE 14 | 25 | 10.0 | 0.40 | 85 | 20 | 15.0 | 0.75 |
| EXAMPLE 15 | 25 | 12.5 | 0.50 | 80 | 18 | 12.5 | 0.69 |
| EXAMPLE 16 | 25 | 17.5 | 0.70 | 85 | 16 | 7.5 | 0.47 |
| EXAMPLE 17 | 25 | 20.0 | 0.80 | 89 | 12 | 5.0 | 0.42 |
| EXAMPLE 18 | 25 | 22.5 | 0.90 | 90 | 12 | 2.5 | 0.21 |

FOR ALL EXAMPLES: D1=7.5MM, D2=0.4MM

PNEUMATIC TIRE WITH TREAD HAVING RIB WITH CHAMFERED WING PORTIONS

TECHNICAL FIELD

The present invention relates to a pneumatic tire and, more particularly, to a pneumatic tire having a rib tread pattern with lug grooves disposed in such a manner that one end of each lug groove terminates in a land portion thereof.

BACKGROUND ART

In recent years, as vehicular operation has become quieter, noise arising from the tire is increasingly a dominant factor contributing to automotive noise, and there is a growing demand for the reduction of it. Such tire noise includes contact frictional vibration noise occurring when the tire engages the road surface and road surface noise caused by the unevenness of the road surface. And, with passenger cars, a large proportion of the noise is pattern noise which is caused by the tread pattern formed on the tire tread surface. In particular, striking noise is caused by the impact of the discontinuous portions of tread pattern, such as lug pattern and block pattern, as they come into contact with the road surface. This noise is also called "pitch noise" because the noise typically becomes louder at a certain frequency (pattern pitch frequency) which is dependent on the pitch distance of lug grooves or blocks and the vehicular speed.

A proposed method for reducing tire noise due to impact as described above consists in employing a plurality of pitch distances so as to prevent any peaking at a single frequency.

Also, as regards lug grooves, there is a method practiced to reduce such impact noise by employing lug grooves angled with respect to the axial direction of the tire.

With tires having a block pattern, on the other hand, it is cited that axially angled lug grooves, which can change the form of each block into a parallelogram, may pose a problem of lowered rigidity of the blocks or uneven wear. Therefore, in a proposed method as illustrated in FIG. 10A, a chamfered portion 51, which is wider on the initially contacting side 50A of a block 50 and narrower in the circumferential direction of the tire and which is below the virtual contour of the tire crown, is provided on the circumferential groove side of the block 50, so that the block 50 engages the road surface gradually, thereby shifting the leading-edge and trailing-edge timings. As a result, the pitch noise is dispersed over the time axis and thus can be reduced. Also, in another proposed method as illustrated in FIG. 10B, a block 60 is provided with a flat portion 61 of a predetermined width from the leading edge 60A to the trailing edge 60B, which has a height equal to the virtual contour of the tire crown and extends at an angle with respect to the circumferential direction of the tire, and sloping portions 62, 63, which are gradually descending toward the respective circumferential grooves, on the initially contacting side 60A and the finally contacting side 60B, respectively, of the block 60. And this arrangement allows the block 60 to engage and disengage the road surface gradually, thereby shifting the leading-edge and trailing-edge timings, so that the pitch noise is reduced (see Reference 1, for instance).
Reference 1: Japanese Unexamined Patent Application Publication No. 2003-25810

DISCLOSURE OF THE INVENTION

Problems to be Solved by the Invention

Figure 11:
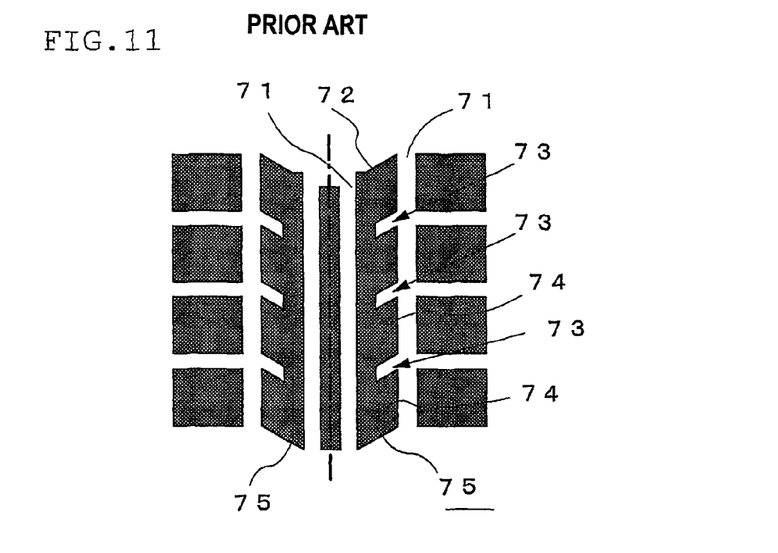
FIG. 11 is a schematic illustration of a tread pattern provided with conventional lug-grooved ribs.

A tread pattern provided with land portions (lug-grooved ribs) 75 as illustrated in FIG. 11 is often used for automobiles. And the land portion 75 comprises a circumferentially continuous rib portion 72 having lug grooves 73, one end of each lug groove opening into a circumferential groove 71 and the other end thereof terminating within the land portion defined by circumferential grooves 71, 71, and wing portions 74 defined by the lug grooves. With tires having a tread pattern like this, a pitch noise dependent on the pitch of the lug grooves 73 also occurs because the tread pattern is made discontinuous by the wing portions 74 defined by the lug grooves 73.

For a tread pattern having circumferentially continuous rib portions 72, such as the above-mentioned lug-grooved ribs 75, a noise suppression measure may be taken by forming the lug grooves 73 such that they extend at an angle to the axial direction of the tire. Accordingly, the contact width of the land portions changes gradually at the leading edge and the trailing edge of the tire footprint. Hence, if the lug grooves 73 are axially angled, the pitch noise can not only be elongated over the time axis, but also the rib portions will have no frequency component of the pattern pitch. As a result, even without the chamfered portion 51 or the sloping portions 62 as mentioned above, the noise level will be made lower than that of tires having a block pattern.

However, if the angle of the lug grooves with respect to the axial direction of the tire is made wider, there will be a greater possibility that the steering stability will not only be lost, but also uneven wear may occur as is often the case with tires having lug grooves. Thus, there are limits to increasing the axial angle of the lug grooves 73. Conventionally, therefore, it has been difficult to reduce the pitch noise without changing the basic features of tread pattern.

The present invention has been made in view of these conventional problems, and an object thereof is to improve the quietness of vehicular operation by reducing the pitch noise caused by lug grooves without changing the basic features of the tread pattern of a pneumatic tire having a rib tread pattern.

Means for Solving the Problems

The inventor of the present invention has reached the following realization as a result of a thorough investigation. That is, on a lug-grooved rib as described above, a chamfer may be provided on the circumferential groove side of each of the wing portions defined by the lug grooves, and this can shift the load to be borne by the wing portions to the circumferentially continuous rib portion which is connected to the wing portions. Such an arrangement can reduce the force of impact entering the wing portions at the leading edge and the trailing edge of the tire footprint, so that the pitch noise caused by the lug grooves will be reduced.

According to a first aspect of the present invention, there is provided a pneumatic tire comprising a tread, the surface of the tread including at least one row of a land portion (lug-grooved rib) which comprises a circumferentially continuous rib portion defined by circumferential grooves extending in the circumferential direction of the tire, the circumferentially continuous rib portion having a plurality of lug grooves, one end of each lug groove opening into one of the circumferential grooves and the other end of each lug groove terminating within the land portion, and a plurality of wing portions defined by the lug grooves, wherein each of the wing portions is provided with a chamfer on the side facing one of the circumferential grooves, the profile line of the chamfer, when viewed in a cross section perpendicular to the axis of rotation of the tire, being located radially inside the virtual contour of the tire crown and the depth of the chamfer increasing as the chamfer approaches the circumferential groove. And this arrangement makes it possible to shift the load to be borne by the wing portions to the rib portion. It is to be noted also that the profile line of the chamfer is preferably in an arc or in a mild convex such as can be expressed by a polynomial equation or the like.

According to a second aspect of the present invention, there is provided a pneumatic tire according to claim 1, wherein the chamfers are formed such that the chamfer width, which is the axial distance of the chamfer along the tire surface, and the chamfer depth, which is the difference between the virtual contour of the tire crown and the profile line of the chamfer, are constant in the circumferential direction of the tire.

According to a third aspect of the present invention, there is provided a pneumatic tire according to claim 1 or claim 2, wherein the chamfer depth D2 satisfies $0.015 \leq (D2/D1) \leq 0.200$ where D1 is the depth of the circumferential groove into which the lug grooves open and D2 is the chamfer depth.

According to a fourth aspect of the present invention, there is provided a pneumatic tire according to any one of claim 1 to claim 3, wherein the chamfer width L2 satisfies $0.1 \leq (L2/L1) \leq 0.85$ where L1 is the axial length of the lug grooves and L2 is the chamfer width.

Also, according to a fifth aspect of the present invention, there is provided a pneumatic tire according to any one of claim 1 to claim 4, wherein the flat portion width L4 satisfies $0.34 \leq (L4/L3) \leq 0.9$ where L3 is the total rib width which is the sum of the axial length of the rib portion and the axial length of the wing portion, and L4 is the flat portion width which is the sum of the axial length of the rib portion and the axial length of the non-chamfered portion of the wing portion.

Effect of the Invention

According to the present invention, on a pneumatic tire provided with at least one row of a land portion (lug-grooved rib) having a circumferentially continuous rib portion and wing portions defined by lug grooves, chamfers, so shaped that the profile line thereof is located radially inside the virtual contour of the tire crown and the difference between the two lines is greater as it approaches a circumferential groove, are provided on the wing portions on the side facing the circumferential groove, so that the load to be borne by the wing portions can be shifted to the rib portion. As a result, the striking force entering the wing portions at the leading edge and the trailing edge of the tire footprint is reduced, thus realizing a marked reduction in pitch noise.

Also, chamfers are formed such that the chamfer width, which is the axial distance of the chamfer along the tire surface, and the chamfer depth, which is the difference between the virtual contour of the tire crown and the profile line of the chamfer, are constant in the circumferential direction of the tire. This arrangement can improve the productivity of the manufacturing process of tire molds because it is easy to specify the simple cross-sectional form of the chamfers.

At the same time, the pitch noise can be reduced with certainty if the chamfer depth D2 is so set that it satisfies $0.015 \leq (D2/D1) \leq 0.200$ where D1 is the depth of the circumferential groove into which the lug grooves open and D2 is the chamfer depth.

Also, the pitch noise can be reduced even further if the chamfer width L2 is so set that it satisfies $0.1 \leq (L2/L1) \leq 0.85$ where L1 is the axial length of a lug groove and L2 is the chamfer width and if the flat portion width L4 is so set that it satisfies $0.34 \leq (L4/L3) \leq 0.9$ where L3 is the total rib width which is the sum of the axial length of the rib portion and the axial length of the wing portion, and L4 is the flat portion width which is the sum of the axial length of the rib portion and the axial length of the non-chamfered portion of the wing portion.

| REFERENCE NUMERALS | |
|---|---|
| 10 | pneumatic tire |
| 11a to 11d | circumferential groove |
| 12 | lateral groove |
| 13 | first land portion |
| 14 | second land portion (lug-grooved rib) |
| 14a | rib portion |
| 14b | wing portion |
| 14c | chamfer |
| 14d | side face on circumferential groove side |
| 15 | lug groove |
| 16 | shoulder block |

BEST MODE FOR CARRYING OUT THE INVENTION

Figure 1:
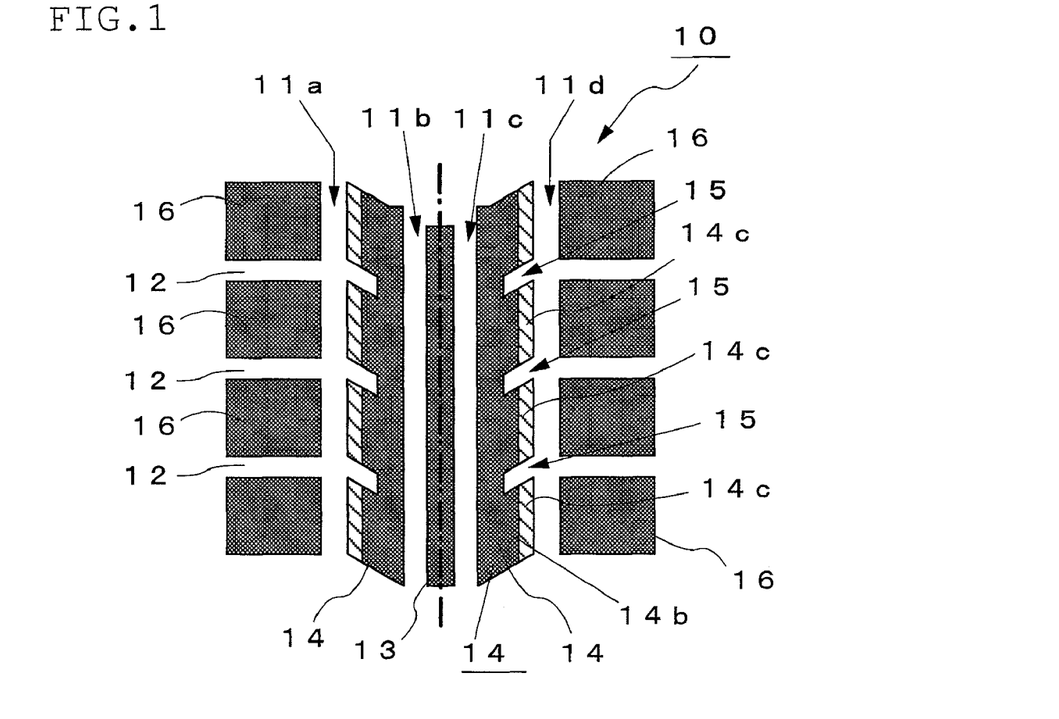
FIG. 1 is a schematic illustration of a tread pattern of a pneumatic tire according to the best mode of the present invention.

The best mode for carrying out the invention will be described hereinbelow by reference to the accompanying drawings. FIG. 1 illustrates an example of a tread pattern of a pneumatic tire 10 according to the best mode of the present invention. In FIG. 1, 11a to 11d are circumferential grooves extending in the circumferential direction of the tire; 12 are lateral grooves extending axially outward respectively from the circumferential grooves 11a and 11d, which are axially outwardly located of the circumferential grooves 11a to 11d; 13 is a first land portion located at the axial center of the tire (tire width center); 14, 14 are second land portions located on either side of the central land portion 13 and having a plurality of lug grooves 15 formed at a predetermined angle with respect to the axial direction, each of the lug grooves 15 having one end thereof opening into the circumferential groove 11a or the circumferential groove 11d and the other end thereof terminating within the land portion; and 16s are shoulder blocks defined by the circumferential grooves 11a and 11d and the lateral grooves 12.

The second land portion 14 is a land portion that has a rib portion 14a extending continuously in the circumferential direction of the tire and a multiplicity of wing portions 14b, defined by the lug grooves 15, 15 and projecting to the circumferential groove 11d (or the circumferential groove 11a) side from the rib portion 14a. Hereinafter, the second land portions 14, 14 will be referred to as lug-grooved ribs.

Figure 2:
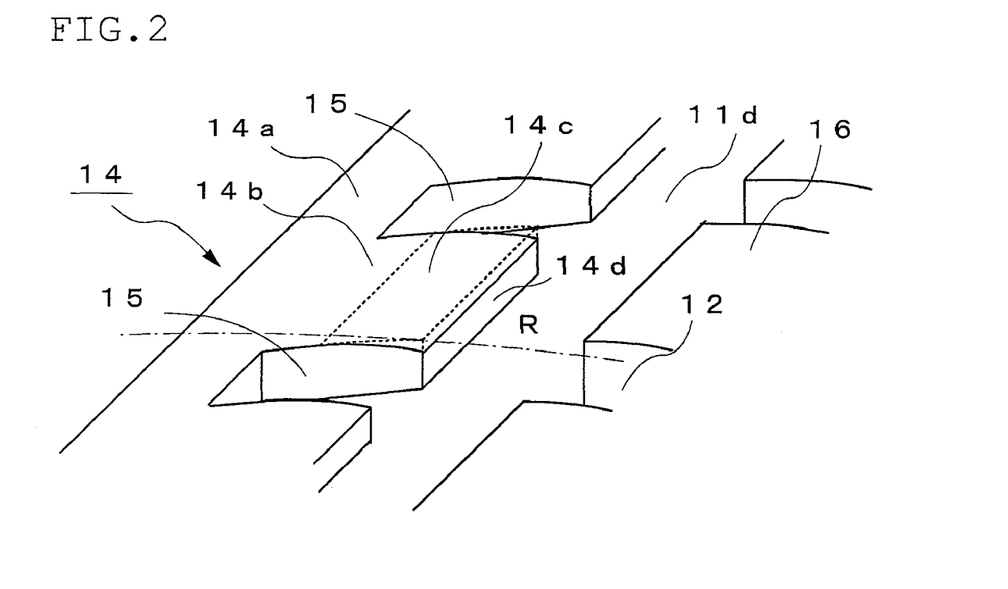
FIG. 2 is a perspective illustration showing the outline of a lug-grooved rib according to the best mode of the present invention.
Figure 3A:
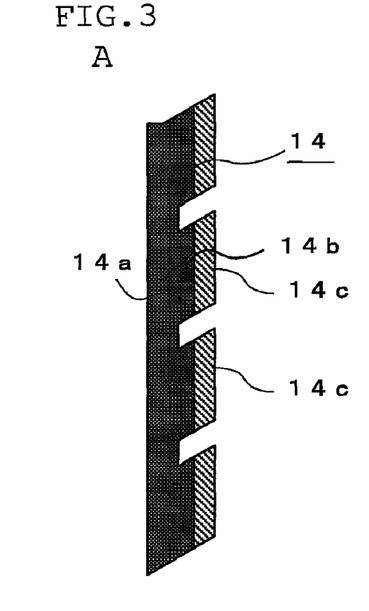
FIG. 3 is plan views and a sectional view of a lug-grooved rib according to the best mode of the present invention.
Figure 3B:
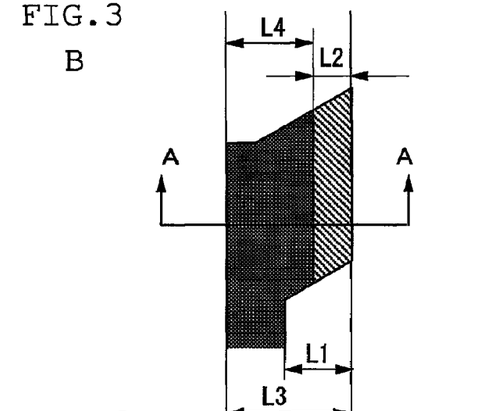
Figure 3C:
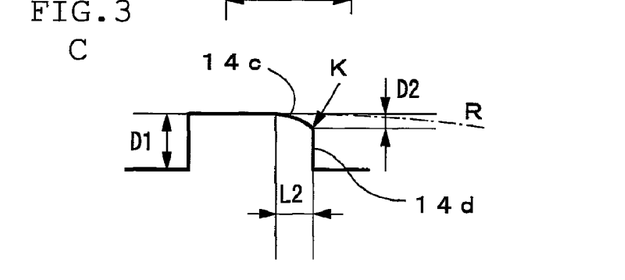

In the best mode of the present invention, as illustrated in FIG. 2, a chamfer 14c, the height of which being lower than the virtual contour R of the tire crown and getting increasingly lower as it approaches the circumferential groove 11d (or the circumferential groove 11a) side, is provided on each wing portion 14b of the lug-grooved rib 14 on the circumferential groove 11d side, that is, on the side opposite to where the wing portion 14b is integrated with the rib portion 14a. It is to be noted that in this embodiment, as illustrated in FIGS. 3A to 3C, the chamfers 14c are formed such that the chamfer width L2, which is the axial distance of the chamfer 14c along the tire surface, and the chamfer depth D2, which is the difference between the virtual contour R of the tire crown and the profile line of the chamfer, are constant in the circumferential direction of the tire. Note also that the reference numeral 14d in FIG. 2 and FIG. 3 is the side face of the wing portion 14b on the circumferential groove 11a (or the circumferential groove 11d) side.

In this manner, the chamfer 14c is provided on the side opposite to where the wing portion 14b is integrated with the rib portion 14a, so that the load to be borne by the wing portion 14b can be shifted to the circumferentially continuous rib portion 14a which is joined to the wing portion 14b. That is, the difference of the wing portion 14b from the block 50, as shown in FIG. 10A, lies in that while the block 50, which stands alone, receives the inputted striking force by itself as the tire engages or disengages the road surface at the leading or trailing edge of its footprint, the wing portion 14b, which is integrated with the rib portion 14a, receives the inputted striking force together with the rib portion 14a. Accordingly, the chamfer 14c provided on the side opposite to where the wing portion 14b is integrated with the rib portion 14a shifts the load to be borne by the wing portion 14b to the rib portion 14a. Compared with cases without the chamfer 14c, therefore, this arrangement makes the rib portion 14a, which has no prominent noise component of pattern pitch, effectively share the striking force entering the wing portion 14b. As a result, the striking force entering the wing portion 14b at the leading edge or the trailing edge of the tire footprint can be reduced, so that the pitch noise caused by the lug grooves 15 will be reduced markedly. It is preferable, therefore, that in order for the lug-grooved rib 14 to work effectively in the tire footprint even when a large input, such as a cornering force, acts thereon, the profile line of the chamfer is formed in an arc having its center on the radially inward side or in a mild convex on the radially outward side such as can be expressed by a polynomial equation or the like.

As for an effective size of the chamfer 14c, the chamfer depth D2 is preferably in a range satisfying $0.015 \leq (D2/D1) \leq 0.200$, where, as shown in FIG. 3C, D1 is the groove depth of the circumferential groove 11d (or the circumferential groove 11a) into which the lug groove 15 opens. In other words, when the chamfer depth ratio (D2/D1), which is the ratio of the chamfer depth D2 to the circumferential groove depth D1, is less than 0.015, the chamfer produces little effect, because it cannot shift the load on the wing portion 14b sufficiently to the rib portion 14a. As a result, the reduction of pattern noise cannot be expected. Conversely, when the chamfer depth ratio (D2/D1) exceeds 0.200, the ground contact area of the entire pattern decreases, thus increasing the mean contact pressure. This may increase the pattern noise due to a local concentration of noise input. Therefore, it is preferable that the chamfer depth ratio (D2/D1) is in a range of 0.015 to 0.200, and it is more preferable if it is in a range of 0.040 to 0.100.

Also, the chamfer width L2 is preferably in a range satisfying $0.1 \leq (L2/L1) \leq 0.85$, where, as shown in FIG. 3B, L1 is the axial length of the lug groove 15. In other words, when the chamfer width ratio (L2/L1), which is the ratio of the chamfer width L2 to the lug groove axial width L1, is less than 0.1, the chamfer region is too small to allow the load on the wing portion 14b to be shifted sufficiently to the rib portion 14a. As a result, the reduction of pattern noise cannot be expected. Conversely, when the chamfer width ratio (L2/L1) exceeds 0.85, the ground contact area of the entire pattern decreases, so that the pattern noise may increase. Therefore, the chamfer width ratio (L2/L1) is preferably in a range of 0.1 to 0.85 and more preferably in a range of 0.4 to 0.8. Further, the most preferable range is 0.6 to 0.7.

Also, the flat portion width L4, which is the axial length of the flat portion of the lug-grooved rib 14, that is, the sum of the axial length of the rib portion 14a and the axial length of the non-chamfered portion of the wing portion 14b, is preferably in a range satisfying $0.34 \leq (L4/L3) \leq 0.9$, where L3 is the total rib width, which is the axial length of the lug-grooved rib 14 (the sum of the axial length of the rib portion 14a and the axial length of the wing portion 14b). In other words, when the flat portion width ratio (L4/L3), which is the ratio of the flat portion width L4 to the total rib width L3, is less than 0.34, it is possible that the pattern noise increases due to the reduction of the ground contact area of the entire pattern. On the other hand, when the flat portion width L4 exceeds 0.9, the chamfered region will be too small to allow the load on the wing portion 14b to be shifted sufficiently to the rib portion 14a. As a result, the reduction of pattern noise cannot be expected. Therefore, the flat portion width ratio (L4/L3) is preferably in a range of 0.34 to 0.9 and more preferably in a range of 0.4 to 0.7.

Also, the chamfer 14c, as shown in FIG. 3c, is preferably connected smoothly to the flat portion on the tire footprint side. It is not, however, connected smoothly to the side face 14d of the circumferential groove 11a (or circumferential groove 11d); the cross section has an apex as indicated by the reference letter K in FIG. 3c. The reason is that any attempt at connecting the chamfer 14c smoothly to the side face 14d will lead to a reduction in ground contact area, which, in turn, may bring about problems of increased sound pressure due to an increased mean contact pressure or worsened braking performance due to the reduced ground contact area.

According to the best mode of the present invention, as hereinbefore described, a pneumatic tire 10 is provided with a lug-grooved rib 14 having a circumferentially continuous rib portion 14a and wing portions 14b defined by lug grooves 15. And on the pneumatic tire 10, a chamfer 14c of depth D2 and width L2 is formed on each of the wing portions 14b on the side facing the circumferential groove 11d. At the same time, the depth D2 and the width L2 of the chamfer 14c are so set that the ratio of the chamfer depth D2 to the groove depth D1 of the circumferential groove 11d satisfies $0.015 \leq (D2/D1) \leq 0.200$ and the ratio of the chamfer width L2 to the axial length L1 of the lug groove 15 satisfies $0.1 \leq (L2/L1) \leq 0.85$. And these settings allow the load to be borne by the wing portion 14b to be effectively shifted to the rib portion 14a. As a result, the striking force entering the wing portion 14b at the leading edge or the trailing edge of the tire footprint can be reduced, so that the pitch noise caused by the lug grooves 15 will be reduced markedly.

Moreover, the pattern noise can be further reduced if the flat portion width L4 is so set that the ratio of the flat portion width L4 of the lug-grooved rib 14 to the total rib width L3 satisfies 0.34≦(L4/L3)≦0.9.

Figure 4A:
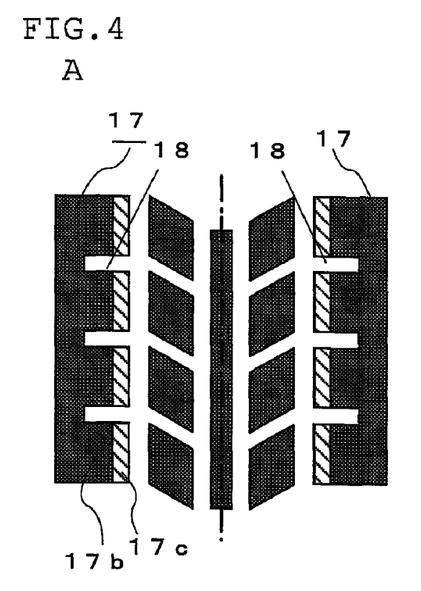
FIG. 4 is schematic illustrations of tread patterns provided with lug-grooved ribs according to the present invention.
Figure 4B:
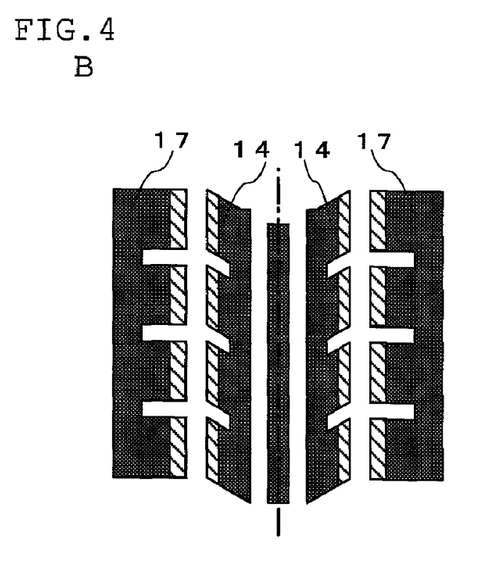

Hereinabove, the best mode of the present invention has been described relative to a pneumatic tire 10 having a tread pattern provided with lug-grooved ribs 14, 14 on either side of a first land portion 13 located in the center of the tire tread, but the present invention is not limited to such an arrangement. For example, as illustrated in FIG. 4A, a tread pattern may have lug-grooved ribs 17, 17 with lug grooves 18 on both shoulders of the tire, and a chamfer 17c may be provided on each of the wing portions 17b of the lug-grooved ribs 17 so as to achieve a similar advantageous effect. Moreover, the present invention may be applicable to a tire having a tread pattern provided with lug-grooved ribs 14, 17 in the middle and shoulder areas thereof as illustrated in FIG. 4B or a tire having a tread pattern provided with other lug-grooved ribs, with the result that the pitch noise is reduced markedly.

Figure 5:
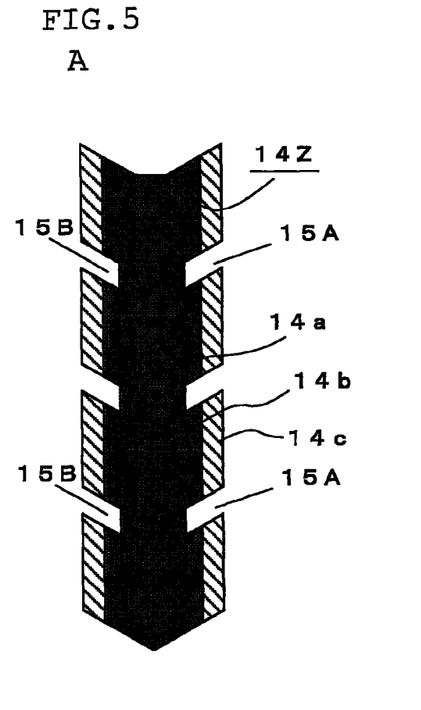
FIG. 5 is schematic illustrations of tread patterns provided with a lug-grooved rib according to the present invention.

Also, the present invention is applicable to a tire having a tread pattern provided with a lug-grooved rib 14Z with lug grooves 15A and 15B on either side thereof as illustrated in FIG. 5A. Or it is applicable to a tire having a tread pattern provided with a lug-grooved rib 14Y, as illustrated in FIG. 5B, for which axially-running lateral grooves 19, such as sipes of 1 mm or less in groove width, which are narrower than the groove width of the lug groove 15 and so narrow as to close up in the tire footprint, are formed.

Also, the lug grooves are not limited to lug grooves 15 formed at a predetermined angle with respect to the axial direction of the tire as described in the present embodiment. Lug grooves extending in a direction parallel to the axial direction of the tire can also reduce the tire noise markedly, provided that the tread has chamfers like the chamfer 14c formed on the wing portions thereof.

Figure 6:
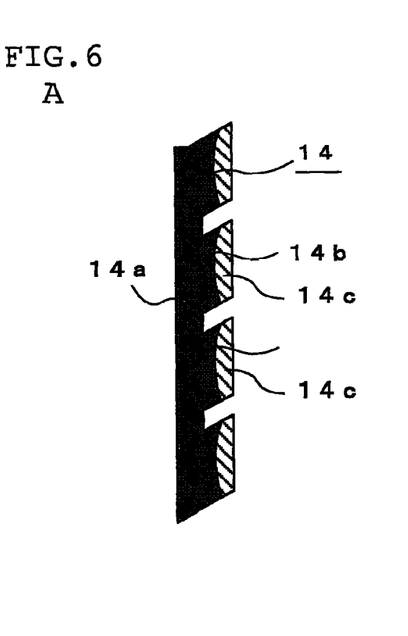
FIG. 6 is schematic illustrations showing other forms of chamfers according to the present invention.

Also, the shape of the chamfer may be curved in the circumferential direction of the tire as illustrated in FIGS. 6A and 6B. However, the chamfer 14c, which is circumferentially straight as in the present embodiment, presents an advantage of convenience because it is easy to specify the cross-sectional form the chamfer in the tire manufacturing process.

EXAMPLES

Figure 10:
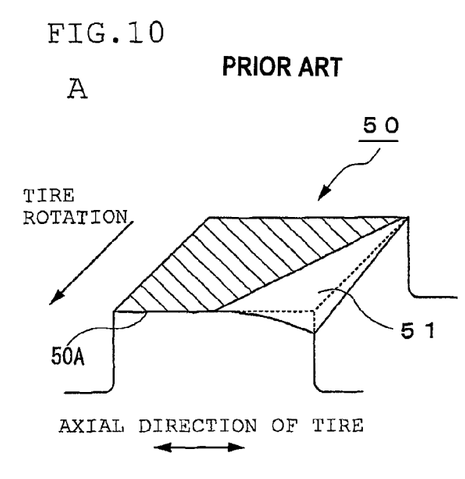
FIG. 10 is illustrations showing the structures of blocks of pneumatic tires with conventional block patterns.

A measurement and evaluation of tire noise was carried out with a tire having a tread pattern provided with a lug-grooved rib with a chamfer on the wing portions thereof according to the present invention (Example 1) and a tire having a tread pattern provided with a lug-grooved rib without a chamfer as shown in FIG. 10 (Conventional Example).

The tire size used was 195/65R15, and the tires were each mounted on a rim of 6J. Also, the load used was 4 kN, and the inner pressure of the tire was 210 kPa.

The evaluation of tire noise was performed in compliance with JASO C606, a standard established by the Japan Automobile Tire Manufacturers Association (JATMA). More specifically, a test tire was run at a speed of 80 km/hr on a rotating drum with a "safety walk (sand paper)" surface. At the same time, the sound pressure level produced by the tire was measured, using a microphone located at 1 meter in the lateral direction from the tire and 0.25 m in height, and the sound pressure level was evaluated by determining an index relative to the conventional level of 100. In this evaluation, the desired level was so set that an improvement (noise reduction) of 10 or more in index value was considered a prospective level promising an advantageous effect in actual vehicle tests.

In Example 1, the total rib width L3 was 20 mm, and the dimensions of the chamfer and the dimensional ratios were set as shown in Table 1 below.

TABLE 1

| Dimensions (mm) | L1 | 15 |
|---|---|---|
| | L2 | 5 |
| | D1 | 7.5 |
| | D2 | 0.4 |
| Dimensional ratios | L2/L1 | 0.333 |
| | D2/D1 | 0.053 |

Also, since the flat portion width L4 is L3−L2=15 mm, the flat portion width ratio (L4/L3) in Example 1 was 0.75.

As a result of the test, the index of the sound pressure level of the tire having a tread pattern of the present invention (Example 1) was found to be 80. Thus, it was confirmed that the tire having a tread pattern of the present invention shows a markedly reduced tire noise compared with the conventional tire.

Figure 7:
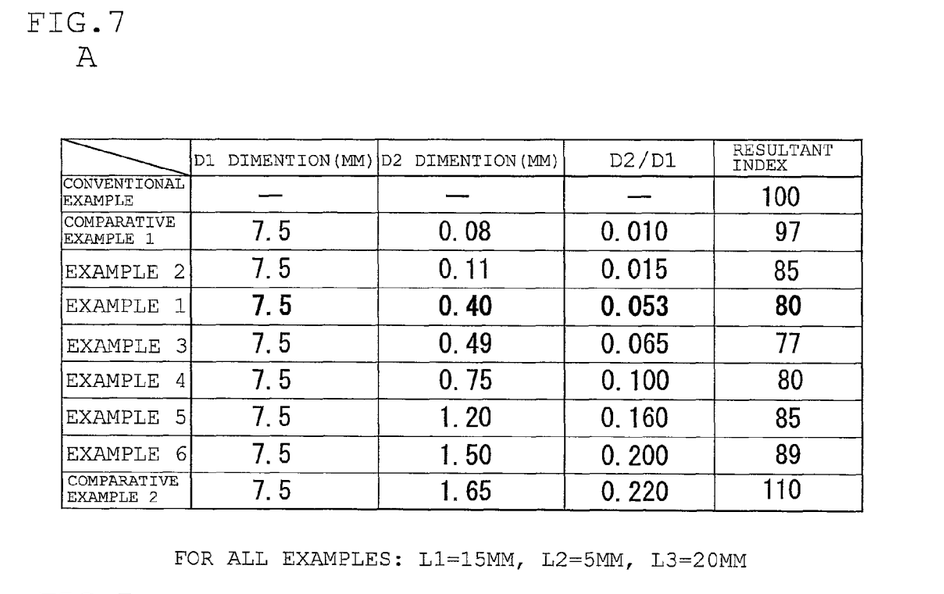
FIG. 7 is diagrams showing a relationship between the chamfer depth ratios and the indexes of sound pressure level.

Next, the sound pressure level was measured by changing the chamfer depth D2 while fixing the total rib width as L3=20 mm, the axial length of the wing portion as L1=15 mm, the chamfer width as L2=5 mm, and the depth of the circumferential groove as D1=7.5 mm. The results are shown in FIGS. 7A and 7B. Note that the horizontal axis of FIG. 7B represents the chamfer depth ratio (D2/D1) and the vertical axis thereof the index (resultant index) K of sound pressure level in relation to the sound pressure level of Conventional Example of 100.

As shown in FIGS. 7A and 7B, Example 3, for which (D2/D1)=0.065, presented the best resultant index as K=77, and it was confirmed that Examples 2 to 6, for which the value of (D2/D1) was 0.015 to 0.200, show an improvement of 10 or more in index value, which is a prospective level promising an advantageous effect in actual vehicle tests.

Also, from the graph of FIG. 7B, it is evident that when the value of (D2/D1) is 0.040 to 0.100, the resultant index is 20 or more, indicating a marked improvement.

On the other hand, Comparative Example 1, for which the value of (D2/D1) was 0.01, presented K=97, which meant almost no improvement. Also, Comparative Example 2, for which the value of (D2/D1) was 0.22, presented K=110, which meant an even worse tire noise than Conventional Example. From this, it was confirmed that to reduce tire noise sufficiently, it is necessary to set the chamfer depth ratio (D2/D1) in a range of 0.015 to 0.200.

Figure 8:
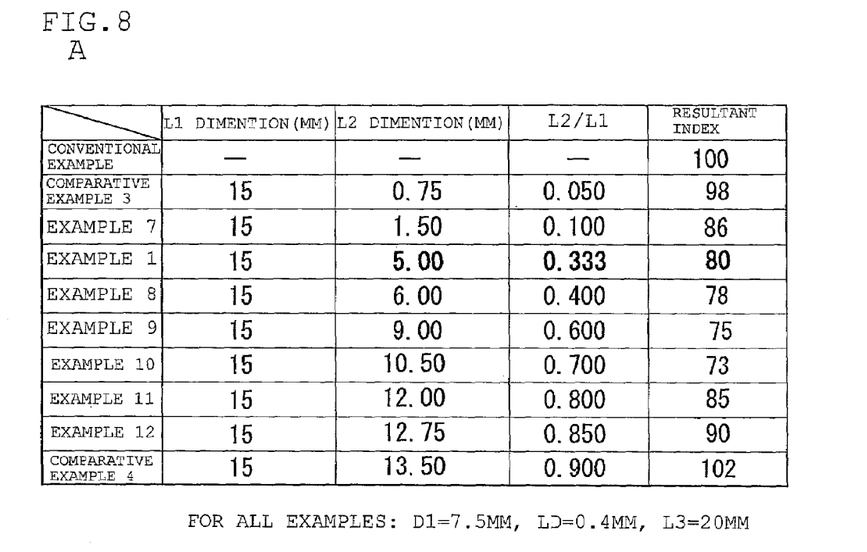
FIG. 8 is diagrams showing a relationship between the chamfer width ratios and the indexes of sound pressure level.

Also, the sound pressure level was measured by changing the chamfer width L2 while fixing the total rib width as L3=20 mm, the depth of the circumferential groove as D1=7.5 mm, the chamfer depth of the wing portion as D2=0.4 mm, and the axial length of the wing portion as L1=15 mm. The results are shown in FIGS. 8A and 8B. Note that the horizontal axis of FIG. 8B represents the chamfer width ratio (L2/L1) and the vertical axis thereof the index (resultant index) K of sound pressure level in relation to the sound pressure level of Conventional Example of 100.

As shown in FIGS. 8A and 8B, Example 9 and Example 10, for which (L2/L1) was in a range of 0.6 to 0.7, presented the best resultant index as K≦75, and it was confirmed that Examples 7 to 12, for which the value of (L2/L1) was 0.1 to 0.85, show an improvement of 10 or more in index value, which is a prospective level promising an advantageous effect in actual vehicle tests.

On the other hand, Comparative Example 3, for which the value of (L2/L1) was 0.05, presented K=98, which meant almost no improvement. Also, Comparative Example 4, for which the value of (L2/L1) was 0.9, presented K=102, which meant a worse tire noise than Conventional Example. Accordingly, it was confirmed that the chamfer width ratio (L2/L1)

should preferably be 0.1 to 0.8 to reduce tire noise sufficiently and more preferably 0.6 to 0.7 to reduce tire noise markedly.

Figure 9:
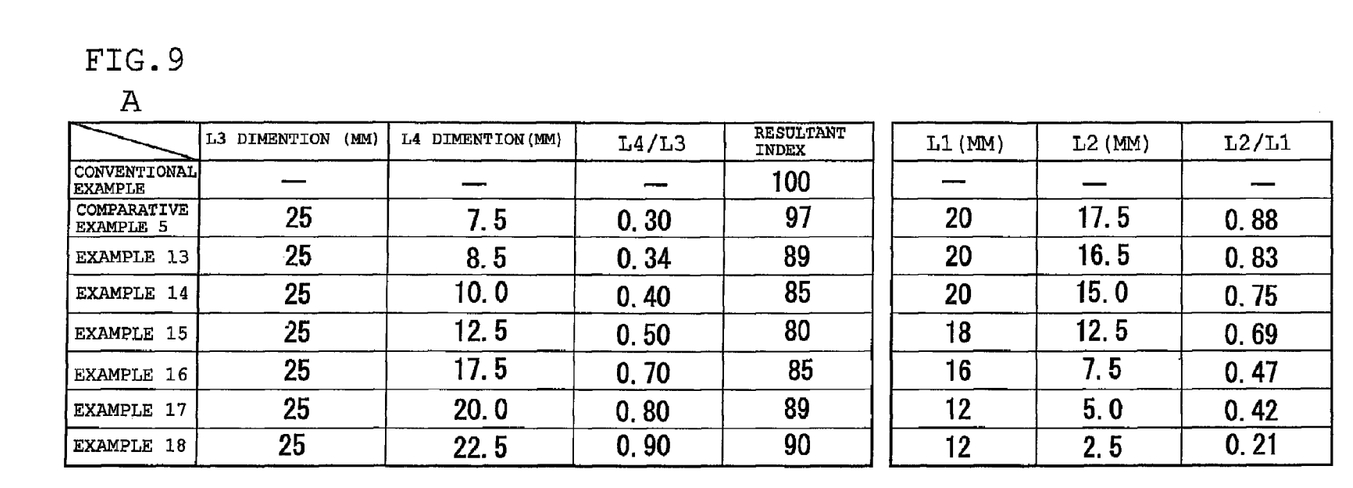
FIG. 9 is diagrams showing a relationship between the flat portion width ratios and the indexes of sound pressure level.

Also, the sound pressure level was measured by changing the flat portion width L4 while fixing the total rib width as L3=25 mm, the depth of the circumferential groove as D1=7.5 mm, and the chamfer depth of the wing portion as D2=0.4 mm. The results are shown in FIGS. 9A and 9B. The horizontal axis of FIG. 9B represents the flat portion width ratio (L4/L3) and the vertical axis thereof the index (resultant index) K of sound pressure level in relation to the sound pressure level of Conventional Example of 100. Note that the axial length L1 of the wing portion shown in FIG. 9A was so set that the width of the rib portion (L3-L1) was not too small (5 mm or more here) and in addition the value of L2 relative to L1 was more than a certain level (0.2 or more here).

As shown in FIGS. 9A and 9B, Example 15, for which (L4/L3)=0.5, presented the best resultant index as K=80, and it was confirmed that Examples 13, 14, and 16 through 18, for which the value of (L4/L3) was 0.34 to 0.9, show an improvement of 10 or more in index, which is a prospective level promising an advantageous effect in actual vehicle tests.

On the other hand, Comparative Example 5, for which the value of (L4/L3) was 0.3, presented K=97, which meant almost no improvement. Accordingly, it was confirmed that to reduce tire noise sufficiently, it is necessary to set the flat portion width ratio (L3/L4) in a range of 0.34 to 0.9.

INDUSTRIAL APPLICABILITY

As discussed herein, according to the present invention, the pitch noise caused by lug grooves of a tire can be reduced without changing the basic features of the tread pattern. A simple structure as set forth herein can easily improve the vehicular ride comfort.

The invention claimed is:

1. A pneumatic tire comprising a tread, the surface of the tread including at least one row of a land portion which comprises
    a circumferentially continuous rib portion defined by circumferential grooves extending in the circumferential direction of the tire, the circumferentially continuous rib portion having a plurality of lug grooves, one end of each lug groove opening into one of the circumferential grooves and the other end of each lug groove terminating within the land portion, and
    a plurality of wing portions defined by the lug grooves,
    wherein each of the wing portions is continuously provided with a chamfer on the side facing one of the circumferential grooves in the circumferential direction of the wing portion, the profile line of the chamfer, when viewed in a cross section perpendicular to the tire circumferential direction, being located radially inside the virtual contour of the tire crown and the depth of the chamfer increasing as approaching the circumferential groove and, a chamfer width, which is a distance of width direction along with a tire surface of the chamfer, gradually increases from the leading edge of the wing portion to the center and gradually decreases from the center to the trailing edge of the wing portion, such that the profile line of the chamfer forms a continuous arc.

2. The pneumatic tire according to claim 1, wherein the chamfer depth D2 satisfies $0.015 \leq (D2/D1) \leq 0.200$ where D1 is the depth of the circumferential groove into which the lug grooves open and D2 is the chamfer depth which is a difference between the virtual contour of the tire crown portion and the profile line of the chamfer.

3. The pneumatic tire according to claim 1, wherein the chamfer width L2 satisfies $0.1 \leq (L2/L1) \leq 0.85$ where L1 is the axial length of the lug grooves and L2 is the chamfer width.

4. The pneumatic tire according to claim 1, wherein the flat portion width L4 satisfies $0.34 \leq (L4/L3) \leq 0.9$ where L3 is the total rib width which is the sum of the axial length of the rib portion and the axial length of the wing portion, and L4 is the flat portion width which is the sum of the axial length of the rib portion and the axial length of the non-chamfered portion of the wing portion.

5. The pneumatic tire according to claim 1, wherein a contact patch side of the chamfer is smooth and has an apex without communicating with the circumferential groove, when viewed in a cross section perpendicular to the tire circumferential direction.

6. The pneumatic tire according to claim 1, wherein an axially running lateral groove is provided in between each wing portion with one end of each lateral groove opening into a respective lug groove and the other end of each lateral groove opening into one of the circumferential grooves.

7. The pneumatic tire according to claim 6, wherein the lateral grooves have a depth that is smaller than the depth of the lug grooves.

8. A pneumatic tire comprising a tread, the surface of the tread including at least one row of a land portion which comprises
    a circumferentially continuous rib portion defined by circumferential grooves extending in the circumferential direction of the tire, the circumferentially continuous rib portion having a plurality of lug grooves, one end of each lug groove opening into one of the circumferential grooves and the other end of each lug groove terminating within the land portion, and
    a plurality of wing portions defined by the lug grooves,
    wherein each of the wing portions is continuously provided with a chamfer on the side facing one of the circumferential grooves in the circumferential direction of the wing portion, the profile line of the chamfer, when viewed in a cross section perpendicular to the tire circumferential direction, being located radially inside the virtual contour of the tire crown and the depth of the chamfer increasing as approaching the circumferential groove and, a chamfer width, which is a distance of width direction along with a tire surface of the chamfer, gradually decreases from the leading edge of the wing portion to the center and gradually increases from the center to the trailing edge of the wing portion, such that the profile line of the chamfer forms a continuous arc.

9. The pneumatic tire according to claim 8, wherein a contact patch side of the chamfer is smooth and has an apex without communicating with the circumferential groove, when viewed in a cross section perpendicular to the tire circumferential direction.

10. The pneumatic tire according to claim 8, wherein an axially running lateral groove is provided in between each wing portion with one end of each lateral groove opening into a respective lug groove and the other end of each lateral groove opening into one of the circumferential grooves.

11. The pneumatic tire according to claim 10, wherein the lateral grooves have a depth that is smaller than the depth of the lug grooves.

* * * * *